US011578218B2

United States Patent
Liu et al.

(10) Patent No.: US 11,578,218 B2
(45) Date of Patent: Feb. 14, 2023

(54) MULTICOLOR DISPERSION AND MULTICOLOR COATING COMPOSITION FORMED THEREFROM

(71) Applicants: Rohm and Haas Company, Collegeville, PA (US); Dow Global Technologies LLC, Midland, MI (US)

(72) Inventors: Hui Liu, Shanghai (CN); Jianming Xu, Shanghai (CN); Yujiang Wang, Shanghai (CN); Yunfei Lan, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 781 days.

(21) Appl. No.: 16/071,176

(22) PCT Filed: Feb. 5, 2016

(86) PCT No.: PCT/CN2016/073601
§ 371 (c)(1),
(2) Date: Jul. 19, 2018

(87) PCT Pub. No.: WO2017/132975
PCT Pub. Date: Aug. 10, 2017

(65) Prior Publication Data
US 2021/0206980 A1    Jul. 8, 2021

(51) Int. Cl.
| C09D 5/29   | (2006.01) |
| C09D 7/61   | (2018.01) |
| C08F 220/14 | (2006.01) |
| C08K 3/34   | (2006.01) |
| C09D 5/02   | (2006.01) |
| C09D 17/00  | (2006.01) |

(52) U.S. Cl.
CPC .............. *C09D 5/29* (2013.01); *C08F 220/14* (2013.01); *C08K 3/346* (2013.01); *C09D 5/028* (2013.01); *C09D 7/61* (2018.01); *C09D 17/001* (2013.01); *C09D 17/007* (2013.01)

(58) Field of Classification Search
CPC . C09D 5/29; C09D 7/61; C09D 5/028; C09D 17/001; C09D 17/007; C08F 220/14; C08K 3/346
See application file for complete search history.

(56) References Cited

U.S. PATENT DOCUMENTS

| 4,127,687 A     | 11/1978 | DuPont |
| 4,898,895 A     | 2/1990  | Masuoka et al. |
| 6,005,031 A *   | 12/1999 | Bremer-Masseus ..... C09D 5/29 524/55 |
| 6,710,112 B1 *  | 3/2004  | Sandor ...................... C08F 2/38 524/458 |
| 10,023,757 B2 * | 7/2018  | Yun ..................... C09B 67/0033 |
| 10,023,759 B2 * | 7/2018  | Yang ........................ C09D 5/00 |
| 10,059,850 B2 * | 8/2018  | Li .......................... C09D 5/4442 |
| 10,167,393 B2 * | 1/2019  | Xu .............................. C08F 2/24 |
| 10,428,235 B2 * | 10/2019 | Yun ......................... C09D 5/02 |
| 10,767,070 B2 * | 9/2020  | Yun ....................... C09D 105/00 |
| 10,894,889 B2 * | 1/2021  | Xu .............................. C09D 7/63 |
| 2004/0077782 A1 | 4/2004  | Heldmann et al. |
| 2013/0190448 A1 | 7/2013  | Deller et al. |
| 2014/0039117 A1* | 2/2014 | Henderson ............... C09D 7/45 524/547 |
| 2015/0059616 A1* | 3/2015 | Yun .................... C09D 101/284 106/162.9 |
| 2015/0148457 A1* | 5/2015 | Yun ..................... C09B 67/0013 524/18 |
| 2017/0101549 A1* | 4/2017 | Liu ........................ C08F 220/18 |
| 2017/0298237 A1* | 10/2017 | Li ............................. C09D 7/43 |

FOREIGN PATENT DOCUMENTS

| CN | 104073066 A    | 10/2014  |                |
| CN | 104419272 A  * | 3/2015   | ......... C09B 67/0033 |

(Continued)

OTHER PUBLICATIONS

Solvay ("Sipomer Specialty Monomers", 2012, p. 1-34). (Year: 2012).*

(Continued)

*Primary Examiner* — Robert S Jones, Jr.
*Assistant Examiner* — Jiangtian Xu
(74) *Attorney, Agent, or Firm* — Karl E. Stauss; Cantor Colburn LLP

(57) ABSTRACT

A multicolor dispersion comprising a protective composition and two or more colorant dispersions, wherein the protective composition comprises (1) an aqueous dispersion of polymer particles comprising from 89% to 99.45% by weight, based on the total dry weight of the protective composition, of polymer particles, wherein said aqueous dispersion of polymer particles further comprises from 0.33% to 2% by weight, based on the total dry weight of the polymer, of an anionic stabilizer monomer represented by the following Formula I, $$R_1\text{—}(R_2\text{—}O)_n\text{—}SO_3M \qquad [\text{Formula I}]$$

wherein $R_1$ is a linkage group between $R_2$ and a vinyl group, $R_2$ is ethylene or propene or butylene, n is from 0 to 50, M is a counter salt of potassium, sodium, ammonium or lithium; wherein said aqueous dispersion of polymer particles further comprises from 0.33% to 5% by weight, based on the total dry weight of the polymer, of a non-reactive anionic surfactant having an ethylene oxide chain length of less than 11; and (2) from 0.5% to 10% by weight, based on the total dry weight of the protective composition, of a clay.

11 Claims, No Drawings

(56) References Cited

FOREIGN PATENT DOCUMENTS

| | | |
|---|---|---|
| EP | 780449 A3 | 2/1998 |
| GB | 1539672 A | 1/1979 |
| KR | 854445 | 8/2008 |
| WO | 1995032862 A1 | 12/1995 |
| WO | 2013181800 A1 | 12/2013 |
| WO | 2015157951 A1 | 10/2015 |
| WO | WO 2015/157951 * | 10/2015 |

OTHER PUBLICATIONS

Extended European Search Report for European Application No. 16 888 800.6, dated Sep. 27, 2019, 13 pages.

* cited by examiner

MULTICOLOR DISPERSION AND MULTICOLOR COATING COMPOSITION FORMED THEREFROM

FIELD OF THE INVENTION

This invention relates to a multicolor dispersion. This invention also relates to a multicolor coating composition comprising the same.

INTRODUCTION

Multicolor coatings are water-based spray-on seamless alternatives to traditional single color coatings. The traditional single color coatings contain one colorant; whereas the multicolor coatings contain at least two colorants with different colors. After spraying, colorant particles are distributed on coating surfaces to simulate natural stone surfaces or other natural multicolor surfaces. The resultant ornamental and durable multicolor surfaces make the final coatings desirable for architectural renovations or new constructions.

The core part of multicolor coatings is a protective composition which protects and separates the colorants in coating dispersions. The protective composition plays a critical role in determining the cost and the performance of final coatings. Without a proper protective composition, multicolor coatings shall be stored and processed under extremely stringent conditions, or the coatings will produce an unnatural look. Further, without a proper protective composition, the colorants might also be easily released from the protective composition into water phase, causing poor multicolor performance Protective compositions usually comprise an aqueous dispersion of polymer particles and hydrous phyllosilicates or natural/synthesized clay to protect the colorant from being contaminated by each other during storage or application. Suitable examples of the clay include lithium magnesium silicates and aluminum magnesium silicates. However, the aqueous dispersion of polymer particles and the silicates usually have poor compatibility, resulting in poor stability and poor color particle consistency during storage.

Therefore, it is desirable to provide a protective composition wherein the aqueous dispersion of polymer particles and the silicates have improved compatibility.

SUMMARY OF THE INVENTION

Inventors of the present invention have surprisingly discovered a novel protective composition which, when formulated into a multicolor coating composition, provides good stability and color particle consistency during storage.

In a first aspect of the present invention there is provided a multicolor dispersion comprising a protective composition and two or more colorant dispersions, wherein the protective composition comprises (1) an aqueous dispersion of polymer particles comprising from 89% to 99.45% by weight, based on the total dry weight of the protective composition, of polymer particles, wherein said aqueous dispersion of polymer particles further comprises from 0.33% to 2% by weight, based on the total dry weight of the polymer, of an anionic stabilizer monomer represented by the following Formula I,

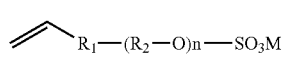
[Formula I]

wherein $R_1$ is a linkage group between $R_2$ and a vinyl group, $R_2$ is ethylene or propene or butylene, n is from 0 to 50, M is a counter salt of potassium, sodium, ammonium or lithium; wherein said aqueous dispersion of polymer particles further comprises from 0.33% to 5% by weight, based on the total dry weight of the polymer, of a non-reactive anionic surfactant having an ethylene oxide chain length of less than 11; and (2) from 0.5% to 10% by weight, based on the total dry weight of the protective composition, of a clay.

In a second aspect of the present invention there is provided an aqueous multicolor coating composition comprising such multicolor dispersion.

DETAILED DESCRIPTION OF THE INVENTION

For the purpose of describing the components, all phrases comprising parenthesis denote either or both of the included parenthetical matter and its absence. For example, the phrase "(co)polymer" includes, in the alternative, polymer, copolymer and the mixture thereof; the phrase "(meth)acrylate" means acrylate, methacrylate, and the mixture thereof.

The multicolor dispersion of the present invention comprises a protective composition, wherein the protective composition comprises an aqueous dispersion of polymer particles comprising from 89% to 99.45%, preferably from 93.4% to 98.9%, and more preferably from 94.5% to 98.35%, by weight, based on the total dry weight of the protective composition, of polymer particles.

Preferably, the polymer particles are polymerization products of at least one ethylenically unsaturated nonionic monomer. "Nonionic monomer" herein means that copolymerized monomer residues do not bear an ionic charge between pH=1-14. Suitable examples of the ethylenically unsaturated nonionic monomers include (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, and hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride.

The aqueous dispersion of polymer particles further comprises from 0.33% to 2%, preferably from 0.5% to 1.8%, and more preferably from 0.8% to 1.6%, by weight, based on the total dry weight of the polymer, of an anionic stabilizer monomer represented by the following Formula I,

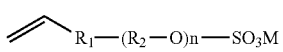
[Formula I]

wherein $R_1$ is a linkage group between $R_2$ and a vinyl group, $R_2$ is ethylene, propene or butylene, n is from 0 to 50, M is a counter salt of potassium, sodium, ammonium and lithium.

Suitable examples of the anionic stabilizer monomers include sodium styrene sulfonate, sodium vinyl sulfonate, sodium 1-allyloxy-2-hydroxypropane sulfonate, 2-acrylamido-2-methylpropanesulfonic acid, and any combinations thereof. Suitable commercially available anionic stabilizer monomers include, for example, SIPOMER COPS-1 available from Solvay Company.

The aqueous dispersion of polymer particles further comprises from 0.33% to 5%, preferably from 0.5% to 3%, and more preferably from 0.8% to 2%, by weight, based on the total dry weight of the polymer, of a non-reactive anionic surfactant having an ethylene oxide chain length ("EO length") of less than 11.

Suitable examples of the non-reactive anionic surfactants include sulfates, sulfonates, phosphates, carboxylates, and any combinations thereof. Preferably, the non-reactive anionic surfactant is sulfonate such as sodium dodecyl benzene sulfonate, sodium dodecyl sulfonate, sodium dodecyl diphenyl oxide disulfonate, sodium n-decyl diphenyl oxide disulfonate, isopropylamine dodecylbenzenesulfonate, and sodium hexyl diphenyl oxide disulfonate, sodium sulfosuccinate. More preferably, the non-reactive anionic surfactant is sodium dodecyl benzene sulfonate. Suitable commercially available non-reactive anionic surfactants include, for example, linear dodecyl benzene sulfonate DISPONIL A-19, DISPONSIL FES-32 and DISPONIL FES-993 all available from BASF Corporation, RHODAFAC DS-4 available from Solvay Company, AEROSOL A-102 and AEROSOL A-103 available from Cytec Industries, or POLYSTEP B-5 available from Stepan Company.

The polymerization techniques used to prepare such aqueous dispersion of polymer particles are well known in the art. Either thermal or redox initiation processes may be used in the polymerization process. Conventional free radical initiators may be used such as hydrogen peroxide, t-butyl hydroperoxide, t-amyl hydroperoxide, ammonium and alkali persulfates, typically at a level of 0.01% to 3.0% by weight, based on the weight of total monomer. Redox systems using the same initiators coupled with a suitable reductant such as sodium sulfoxylate formaldehyde, sodium hydrosulfite, isoascorbic acid, hydroxylamine sulfate and sodium bisulfite may be used at similar levels, optionally in combination with metal ions such as iron and copper, optionally further including complexing agents for the metal. The monomer mixture may be added in a single addition or more additions or continuously over the reaction period using a uniform or varying composition. Additional ingredients such as free radical initiators, oxidants, reducing agents, chain transfer agents, neutralizers, surfactants, and dispersants may be added prior to, during, or subsequent to the monomer addition.

The protective composition further comprises from 0.5% to 10%, preferably from 1% to 6%, and more preferably from 1.5% to 5%, by weight, based on the total dry weight of the protective composition, of a clay.

Preferably, the clays are hydrous phyllosilicates, with variable amounts of iron, magnesium, alkali metals, aluminum, alkaline earths, and other cations. Suitable examples of the clays include lithium magnesium silicate, such as LAPONITE RD clay and LAPONITE RDS clay commercially available from BYK, and aluminum magnesium silicate, such as VEEGUM magnesium aluminum silicate commercially available from R. T. Vanderbilt Company, Inc.

The protective composition may further comprise from 0.05% to 1%, preferably from 0.1% to 0.6%, and more preferably from 0.15% to 0.5%, by weight, based on the total dry weight of the protective composition, of a peptizing agent.

Preferably, the peptizing agents are sodium pyrophosphate, sodium carbonate, sodium polyphosphate, sodium metaphosphate, sodium polyacrylate, and sodium hydroxide. Sodium ion can be also replaced by other monovalent alkali metal ions, such as lithium and potassium.

The multicolor dispersion of the present invention further comprises two or more colorant dispersions.

The colorant dispersion may comprise from 0.05% to 10%, preferably from 0.1% to 7%, and more preferably from 0.5% to 5%%, by weight, based on the total weight of the colorant dispersion, of a colorant. The colorants are organic or inorganic colorant particles, preferably inorganic colorant particles.

The colorant dispersion may further comprise from 0.05% to 10%, preferably from 0.1% to 8%, and more preferably from 0.5% to 5%, by weight, based on the total weight of the colorant dispersion, of a polysaccharide.

Suitable examples of the polysaccharide include methylcellulose (MC), hydropropylmethylcellulose (HPMC), hydroylethylmethylcelulose (HEMC), hydroxybutylmethylcullulose (HBMC), hydroxyethylethylcellulose (HEEC), and the mixture thereof.

Optionally, the colorant dispersion further comprises from 0.5% to 75%, preferably from 2% to 50%, and more preferably from 5% to 40%, by weight, based on the total weight of the colorant dispersion, of an aqueous dispersion of polymer particles.

Preferably, the colorant dispersion is prepared from a colorant and PRIMAL™ TX-220, which is commercially available from the Dow Chemical Company.

A color dispersion comprising only a single colorant dispersion could be used to prepare a single-color coating composition. More colorant dispersions each comprising different colorants may be used to prepare the multicolor dispersion.

In one embodiment of the present invention, a two-color dispersion is prepared by mixing a dispersion of protected first colorant particles with a dispersion of protected second colorant particles. The dispersion of protected first colorant particles is prepared by mixing a first colorant dispersion with the protective composition. The weight ratio of the first colorant dispersion to the protective composition is from 1:10 to 10:1, preferably from 1:7 to 7:1, and more preferably from 1:5 to 5:1. The dispersion of protected second colorant particles that has a different color from that of the first colorant is prepared by using the same procedure as outline for the dispersion of protected first colorant particles, substituting the first colorant dispersion with a second colorant dispersion.

Multicolor dispersion further comprising a third colorant dispersion, a fourth colorant dispersion, a fifth colorant dispersion, and so on, can be prepared by following the procedure outlined for the two-color dispersion.

The aqueous multicolor coating composition of the present invention may be prepared by techniques which are well known in the coatings art. In one embodiment, the aqueous multicolor coating composition of the present invention may be prepared by mixing the multicolor dispersion and other coating additives. Illustrative examples of coating additives include coalescing agents, cosolvents, buffers, neutralizers, thickeners, non-thickening rheology modifiers, dispersants, humectants, wetting agents, mildewcides, biocides, plasticizers, defoaming agents, anti-skinning agents, flowing agents, crosslinkers, and anti-oxidants. Components in the aqueous multicolor coating composition may be mixed in any order to provide the aqueous multicolor coating composition of the present invention. Any of the above-mentioned optional components may also be added to the composition during or prior to the mixing to form the aqueous multicolor coating composition.

Suitable examples of the thickeners include polyvinyl alcohol, hydrophobically modified alkali soluble emulsions, alkali-soluble or alkali swellable emulsions, hydrophobically modified ethylene oxide-urethane polymers, cellulosic thickeners such as hydroxyl methylcellulose, hydroxyethylcellulose, hydrophobically-modified hydroxyethylcellulose, sodium carboxymethylcellulose, fumed silica, attapulgite clay and other clays. Titanate chelating agents can also be used as the thickeners of the present invention.

Suitable examples of the dispersants include non-ionic, anionic and cationic dispersants such as polyacid with suitable molecular weight, 2-amino-2-methyl-1-propanol, dimethyl amino ethanol, potassium tripolyphosphate, trisodium polyphosphate, citric acid and other carboxylic acids. Preferred dispersants are the polyacids with suitable molecular weight such as homopolymers and copolymers based on polycarboxylic acids, including those that have been hydrophobically or hydrophilically modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and the mixture thereof. The molecular weight ("Mn") of such polyacid dispersant is from 400 to 50,000, preferably from 400 to 30,000, more preferably from 500 to 10,000, even more preferably from 1,000 to 5,000, and most preferably from 1,500 to 3,000.

Suitable examples of the defoaming agents include silicone-based and mineral oil-based defoamers.

Suitable examples of the wetting agents include anionic, nonionic, cationic surfactants and amphiphilic surfactant. Preferably, anionic and nonionic surfactants, and more preferably, nonionic surfactants are used.

Biocides used in the present invention can be organic or inorganic biocides. Illustrative examples are described in U.S. Pat. Nos. 4,127,687, 4,898,895, and WO1995032862A1. Preferably, the biocides have an active structure of diiodomethyl-p-tolylsulfone, 4,5-dichloro-2-octyl-2H-isothiazol-3-one, chloromethylisothiazolinone and methylisothiazolinone, and the mixture thereof.

The process of using the aqueous multicolor coating composition of the present invention may comprise the following: applying the aqueous multicolor coating composition to a substrate and drying the applied coating composition. The aqueous multicolor coating composition of the present invention can be applied to a substrate by known means such as brushing, dipping, rolling and spraying. The aqueous multicolor coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous multicolor coating composition of the present invention has been applied to a substrate, the aqueous multicolor coating composition may be dried, or be allowed to dry, at room temperature (21-25° C.), or at an elevated temperature, for example, from 35° C. to 60° C. to form a film.

The aqueous multicolor coating composition of the present invention can be applied to, and adhered to, various substrates. Suitable examples of the substrates include wood, metals, plastics, foams, stones, elastomeric substrates, glass, fabrics, or concrete.

In the present invention, the technical features in each preferred technical solution and more preferred technical solution can be combined with each other to form new technical solutions unless indicated otherwise. For briefness, the specification omits the descriptions for these combinations. However, all the technical solutions obtained by combining these technical features should be deemed as being literally described in the present specification in an explicit manner.

In order to further illustrate this invention the following examples are presented. However, it should be understood that the invention is not limited to these illustrative examples.

| Abbreviation | |
| --- | --- |
| AM | acrylamide |
| AMPS | 2-acrylamido-2-methylpropanesulfonic acid |
| APS | ammonium persulfate |
| BA | butyl acrylate |
| EDTA | ethylene diamine tetraacetic acid |
| IAA | isoascorbic acid |
| MMA | methyl methacrylate |
| (M)AA | (meth)acrylic acid |
| SPS | Sodium persulfate |
| SPP | sodium pyrophosphate |
| SSS | sodium styrene sulfonate |
| t-BHP | tert-butyl hydroperoxide |
| 2-EHA | 2-ethyl hexyl acrylate |

EXAMPLES

I. Raw Materials Used

| Material | Function | Supplier |
| --- | --- | --- |
| ACRYSOL ™ SCT-275 | thickener | The Dow Chemical Company |
| ACRYSOL ™ TT-935 | thickener | The Dow Chemical Company |
| ADVANTAGE AM1512 | defoamer | Ashland Industries |
| AEROSOL A-102 ("A-102") | surfactant | Cytec Industries |
| AMP-95 | neutralizer | The Dow Chemical Company |
| AMPS 2405 ("AMPS") | stabilizer | Lubrizol Corporation |
| DISPONIL A-19 | surfactant | BASF Corporation |
| DISPONIL FES-32 ("FES-32") | surfactant | BASF Corporation |
| DISPONIL FES-77 ("FES-77") | surfactant | BASF Corporation |
| DISPONIL FES-993 ("FES-993") | surfactant | BASF Corporation |
| KATHON ™ LXE | biocide | The Dow Chemical Company |
| LAPONITE RD | clay | BYK |
| LATEMUL PD-104 ("PD-104") | surfactant | Kao Corporation |
| PRIMAL ™ TX-200 ("TX-200") | colorant dispersion | The Dow Chemical Company |
| RHODAFAC DS-4 ("DS-4") | surfactant | Solvay Company |
| RHODAFAC RS-610/A25 ("RS-610") | surfactant | Solvay Company |
| SIPOMER COPS-1 ("COPS-1") | stabilizer | Solvay Company |
| SIPOMER COPS-3 ("COPS-3") | stabilizer | Solvay Company |
| TERGITAL ™ 15-S-40 ("15-S-40") | surfactant | The Dow Chemical Company |
| TERGITAL ™ 15-S-9 ("15-S-9") | surfactant | The Dow Chemical Company |
| TEXANOL | coalescent | Eastman Chemical Company |
| XERACOLOUR red oxide | colorant | International Chemical Corporation |
| XERACOLOUR yellow oxide | colorant | International Chemical Corporation |

II. Test Methods

1. Test Method for Compatibility with Clay

To test the compatibility of an aqueous dispersion of polymer particles with clay, 100 g LAPONITE RD clay was dissolved in 900 g 1% tetrasodium pyrophosphate solution. The clay solution was agitated until transparent. Thereafter, the aqueous dispersion of polymer particles to be tested and the LAPONITE RD clay 10% solution were blended at 2:1 ratio by weight. The mixture was in a room-temperature storage condition. The mixture was measured by Brookfield DV1 viscometer. The storage time was recorded when the mixture viscosity (4 #spindle, 60 rpm) went up to 4000 CPS. If the storage time was longer than 30 days, the mixture passed the compatibility test.

2. Test Method for Storage Stability of Aqueous Multicolor Coating Compositions To test the storage stability of a multicolor coating composition, the aqueous multicolor coating composition was stored in 5° C. (refrigerator), room temperature, and 50° C. (oven) storage conditions separately for 30 days.

After the aqueous multicolor coating composition was balanced under room temperature for 1 day, viscosities of the aqueous multicolor coating composition in different storage conditions were tested by a Stormer viscometer according to the ASTM (American Society for Testing and Materials) D562 method. The acceptable Krebs units ("KU") level for the viscosity of the aqueous multicolor coating composition is less than 110. If the KU level is higher than 140, the multicolor coating composition was recorded as gelled.

The appearance of the aqueous multicolor coating composition was observed after the viscosity test. If bleeding was observed, the aqueous multicolor coating composition was recorded as bleeding. Otherwise, the aqueous multicolor coating composition was recorded as having good appearance.

III. Examples

1. Preparation of Aqueous Dispersions of Polymer Particles

Inventive Aqueous Dispersion 1

A monomer emulsion was first prepared by mixing 301.4 g 2-EHA, 368.5 g MMA, 10.5 g MAA, 11.4 g COPS-1, 7.35 g FES-32, and 180.0 g water. The emulsion was then emulsified with stirring.

A 5-liter multi-neck flask fitted with a mechanical stirrer was then charged with a solution of 18.19 g DISPONIL A-19 in 880 g DI water, and heated to 83° C. under a nitrogen atmosphere. A solution of 0.83 g $Na_2CO_3$ in 7.39 g water, a solution of 1.4 g APS in 11.1 g water, and 25 g monomer emulsion were then charged to the flask with agitation. After the reaction temperature reached an exothermic peak, the remaining monomer emulsion and a solution of 0.7 g SPS in 27.7 g water were gradually added to the flask over a span of 120 minutes. The polymerization reaction temperature was maintained at 81° C. The emulsion feed line was rinsed with 30.0 g DI water. Thereafter, a solution of 0.0076 g $FeSO_4.7H_2O$ in 5 g water and a solution of 0.0076 g EDTA in 5 g water were charged to flask. Upon the completion of the additions, a solution of 0.4 g t-BHP in 12.6 g water and a solution of 0.49 g IAA in 12.6 g water were gradually added to the flask over a span of 30 minutes. After the reaction was cooled to below 50° C., 3.69 g ammonium was used to neutralize the aqueous dispersion of polymer particles.

Inventive Aqueous Dispersions 2 to 8

Inventive Aqueous Dispersions 2 to 8 were prepared by using the same procedure as outlined for Inventive Aqueous Dispersion 1, except for the amounts of different surfactants and stabilizer monomers being used in making monomer emulsions. The amounts of various surfactants and stabilizer monomers (in grams) to make monomer emulsions for Inventive Aqueous Dispersions 2 to 8 are shown in TABLE 1 below.

Comparative Aqueous Dispersions 1 to 12

Comparative Aqueous Dispersions 1 to 12 were prepared by using the same procedure as outlined for Inventive Aqueous Dispersion 1, except for the amounts of different surfactants and stabilizer monomers being used in making monomer emulsions. The amounts of various surfactants and stabilizer monomers (in grams) to make monomer emulsions for Comparative Aqueous Dispersions 1 to 12 are shown in TABLE 1 below.

TABLE 2

| Monomer Emulsion | Surfactant | Stabilizer monomer |
| --- | --- | --- |
| Inventive Aqueous Dispersion 1 | 7.35 g FES-32 | 11.4 g COPS-1 |
| Inventive Aqueous Dispersion 2 | 7.35 g A-102 | 11.4 g COPS-1 |
| Inventive Aqueous Dispersion 3 | 11.3 g FES-993 | 11.4 g COPS-1 |
| Inventive Aqueous Dispersion 4 | 7.35 g A-102 | 9.42 g AMPS |
| Inventive Aqueous Dispersion 5 | 7.35 g A-102 | 5.0 g SSS |
| Inventive Aqueous Dispersion 6 | 7.35 g A-102 | 5.7 g COPS-1 |
| Inventive Aqueous Dispersion 7 | 7.35 g A-102 | 17.25 g COPS-1 |
| Inventive Aqueous Dispersion 8 | 7.35 g A-102 | 34.63 g COPS-1 |
| Comparative Aqueous Dispersion 1 | 7.35 g FES-32 | 0 |
| Comparative Aqueous Dispersion 2 | 7.35 g A-102 | 0 |
| Comparative Aqueous Dispersion 3 | 6.77 g Fes-77 | 11.4 g COPS-1 |
| Comparative Aqueous Dispersion 4 | 11.4 g DS-4 | 0 |
| Comparative Aqueous Dispersion 5 | 9.12 g RS-610 | 0 |
| Comparative Aqueous Dispersion 6 | 11.4 g PD-104 | 0 |
| Comparative Aqueous Dispersion 7 | 7.35 g A-102 | 86.58 g COPS-1 |
| Comparative Aqueous Dispersion 8 | 7.35 g FES-32 | 4.56 g AM |
| Comparative Aqueous Dispersion 9 | 13.84 g 15-S-9 | 11.43 g COPS-1 |
| Comparative Aqueous Dispersion 10 | 11.4 g PD-104; 13.84 g 15-S-9 | 11.43 g COPS-1 |
| Comparative Aqueous Dispersion 11 | 11.4 g PD-104; 19.77 g 15-S-40 | 11.43 g COPS-1 |
| Comparative Aqueous Dispersion 12 | 7.35 g A-102 | 11.43 g COPS-3 |

2. Preparation of Protective Compositions

Inventive Protective Composition 1

299.0 g distilled water was added to a 2000 ml container, followed by a 400.0 g LAPONITE RD clay 10% solution. The solution was stirred evenly for 10 minutes. Then, 290.0 g Inventive Aqueous Dispersion 2, 10.0 g TEXANOL and 1.0 g KATHON LXE were added to the container in sequence. All the materials were stirred for 30 minutes. The total amount of the composition was adjusted to 1000 g with water to obtain Inventive Protective Composition 1.

Inventive Protective Compositions 2 to 5 and Comparative Protective Compositions 1 to 2

Inventive Protective Compositions 2 to 5 and Comparative Protective Compositions 1 to 2 were prepared by using the same procedure as outlined for Inventive Protective Composition 1, except for the amounts of different aqueous dispersions being used in making protective compositions. The amounts of various aqueous dispersions (in grams) to make Inventive Protective Compositions 1 to 5 and Comparative Protective Compositions 1 to 2 are shown in TABLE 3.

TABLE 3

| Protective Compositions | Aqueous Dispersions | Clay |
|---|---|---|
| Comparative Protective Composition 1 | 290 g Comparative Aqueous Dispersion 2 | 400 g LAPONITE RD 10% solution |
| Inventive Protective Composition 1 | 290 g Inventive Aqueous Dispersion 2 | 400 g LAPONITE RD 10% solution |
| Comparative Protective Composition 2 | 560 g Comparative Aqueous Dispersion 2 | 200 g LAPONITE RD 10% solution |
| Inventive Protective Composition 2 | 560 g Inventive Aqueous Dispersion 2 | 200 g LAPONITE RD 10% solution |
| Inventive Protective Composition 3 | 560 g Inventive Aqueous Dispersion 1 | 200 g LAPONITE RD 10% solution |
| Inventive Protective Composition 4 | 560 g Inventive Aqueous Dispersion 4 | 200 g LAPONITE RD 10% solution |
| Inventive Protective Composition 5 | 560 g Inventive Aqueous Dispersion 5 | 200 g LAPONITE RD 10% solution |

3. Preparation of Multicolor Dispersions and Aqueous Multicolor Coating Compositions Inventive Multicolor Dispersion 1 and Inventive Aqueous Multicolor Coating Composition 1

2 g XERACOLOUR red oxide colorant was added into 200 g TX-200 with agitation to obtain Colorant Dispersion 1. Then 2 g XERACOLOUR yellow oxide colorant was added into another 200 g TX-220 with agitation to obtain Colorant Dispersion 2. Then Colorant Dispersions 1 and 2 were added into 400 g Inventive Protective Composition 1 sequentially with agitation for 10 minutes to form Inventive Multicolor Dispersion 1. Then, 1.23 g AMP-95, 3.57 g ACRYSOL™ TT-935 (with 50% dilution), 1.05 g ACRYSOL™ SCT-275, 0.21 g ADVANTAGE AM1512 were added into Inventive Multicolor Dispersion 1 to obtain Inventive Aqueous Multicolor Coating Composition 1.

Inventive Multicolor Dispersions 2 to 5 and Inventive Aqueous Multicolor Coating Compositions 2 to 5

Inventive Multicolor Dispersions 2 to 5 and Inventive Aqueous Multicolor Coating Compositions 2 to 5 were prepared by using the same procedure as outlined for Inventive Multicolor Dispersion 1 and Inventive Aqueous Multicolor Coating Composition 1, except for the different protective compositions being used. The types of various protective compositions (in grams) to make Inventive Multicolor Dispersions 2 to 5 and Inventive Aqueous Multicolor Coating Compositions 2 to 5 are shown in TABLE 4.

Comparative Multicolor Dispersions 1 to 2 and Comparative Aqueous Multicolor Coating Compositions 1 to 2

Comparative Multicolor Dispersions 1 to 2 and Comparative Aqueous Multicolor Coating Compositions 1 to 2 were prepared by using the same procedure as outlined for Inventive Multicolor Dispersion 1 and Inventive Aqueous Multicolor Coating Composition 1, except for the different protective compositions being used. The types of various protective compositions (in grams) to make Comparative Multicolor Dispersions 1 to 2 and Comparative Aqueous Multicolor Coating Compositions 1 to 2 are shown in TABLE 4.

TABLE 4

| Coating Composition | Color Dispersion | Protective Composition | Colorant Dispersion |
|---|---|---|---|
| Inventive Aqueous Multicolor Coating Composition 1 | Inventive Multicolor Dispersion 1 | 400 g Inventive Protective Composition 1 | 200 g Colorant Dispersion 1; |
| Inventive Aqueous Multicolor Coating Composition 2 | Inventive Multicolor Dispersion 2 | 400 g Inventive Protective Composition 2 | 200 g Colorant Dispersion 2 |
| Inventive Aqueous Multicolor Coating Composition 3 | Inventive Multicolor Dispersion 3 | 400 g Inventive Protective Composition 3 | |
| Inventive Aqueous Multicolor Coating Composition 4 | Inventive Multicolor Dispersion 4 | 400 g Inventive Protective Composition 4 | |
| Inventive Aqueous Multicolor Coating Composition 5 | Inventive Multicolor Dispersion 5 | 400 g Inventive Protective Composition 5 | |
| Comparative Aqueous Multicolor Coating Composition 1 | Comparative Multicolor Dispersion 1 | 400 g Comparative Protective Composition 1 | |
| Comparative Aqueous Multicolor Coating Composition 2 | Comparative Multicolor Dispersion 2 | 400 g Comparative Protective Composition 2 | |

IV. Results

For purpose of demonstrating the superior properties of the protective compositions of multicolor coating compositions embodying the present invention, numerous aqueous dispersion, protective composition, color dispersion and coating composition samples with various combinations of key ingredients have been prepared and analyzed. TABLE 5 below lists the compatibilities of the inventive and comparative aqueous dispersions with clay. TABLE 6 below lists the stabilities of the inventive and comparative coating compositions.

First, a comparison was made between aqueous dispersions prepared by using a stabilizer monomer (i.e., Inventive Aqueous Dispersions 1 to 5) and those prepared without using a stabilizer monomer (i.e., Comparative Aqueous Dispersions 1, 2 and 4 to 6). As TABLE 5 illustrates, Inventive Aqueous Dispersions 1 to 5 exhibit good compatibility (greater than 30 days) with the clay; whereas Comparative Aqueous Dispersions 1, 2 and 4 to 6 exhibit poor compatibility (less than 10 days) with the clay.

Second, a comparison was made between aqueous dispersions prepared by using an anionic surfactant having an EO length of less than 11 (i.e., Inventive Aqueous Dispersions 1 to 5) and that prepared by using an anionic surfactant having an EO length of greater than 11 (i.e., Comparative Aqueous Dispersion 3). As TABLE 5 illustrates, Inventive Aqueous Dispersions 1 to 5 exhibit good compatibility (greater than 30 days) with the clay; whereas Comparative Aqueous Dispersion 3 exhibits poor compatibility (less than 15 days) with the clay.

Third, a comparison was made between aqueous dispersions prepared by using less than 2% by weight, based on the total dry weight of the polymer, of an anionic stabilizer monomer (i.e., Inventive Aqueous Dispersions 2, 6, and 7) and that prepared by using greater than 2% by weight, based on the total dry weight of the polymer, of an anionic stabilizer monomer (i.e., Comparative Aqueous Dispersion 7). As TABLE 5 illustrates, Inventive Aqueous Dispersions 2, 6, and 7 exhibit good compatibility (greater than 30 days) with the clay; whereas Comparative Aqueous Dispersion 7 exhibits poor compatibility (less than 10 days) with the clay due to a high stabilizer level (i.e., 5%, greater than 2%).

Fourth, a comparison was made between aqueous dispersions prepared by using a non-reactive anionic surfactant (i.e., Inventive Aqueous Dispersions 1 to 3) and those prepared by using a nonionic surfactant and/or a reactive anionic surfactant (i.e., Comparative Aqueous Dispersions 9 to 11). In particular, Comparative Aqueous Dispersion 9 used a nonionic surfactant 15-S-9; Comparative Aqueous Dispersion 10 used a nonionic surfactant 15-S-9 and a reactive anionic surfactant PD-104; Comparative Aqueous Dispersion 11 used a nonionic surfactant 15-S-40 and a reactive anionic surfactant PD-104. As TABLE 5 illustrates, the nonionic surfactants being added either during or after the emulsion polymerization process could not increase the compatibility; the reactive surfactants also show poor compatibility compared to the none-reactive anionic surfactant, thus Comparative Aqueous Dispersions 9 to 11 exhibit poor compatibilities (less than 10 days) with the clay.

Fifth, a comparison was made between aqueous dispersions prepared by using an anionic stabilizer (i.e., Inventive Aqueous Dispersions 1 to 5) and those prepared by using a nonionic stabilizer (i.e., Comparative Aqueous Dispersions 8 and 12). In particular, Comparative Aqueous Dispersion 8 used a nonionic stabilizer AM; Comparative Aqueous Dispersion 12 used a nonionic stabilizer COPS-3. As TABLE 5 illustrates, the nonionic stabilizer hurts the compatibility dramatically, thus Comparative Aqueous Dispersions 8 and 12 exhibit poor compatibility (less than 10 days) with the clay.

Sixth, a comparison was made between multicolor coating compositions prepared by using the inventive protective compositions (i.e., Inventive Coating Compositions 1 to 5) and multicolor coating compositions prepared by using the comparative protective compositions (i.e., Comparative Coating Compositions 1 to 2). As TABLE 6 illustrates, Inventive Coating Compositions 1 to 5 all show good stabilities (i.e., an acceptable viscosity level (KU<110)) and color particle consistency (i.e., good appearance); whereas Comparative Coating Compositions 1 and 2 are not acceptable (i.e., Comparative Coating Compositions 1 and 2 have bleeding issues and higher viscosities level (KU>110 or gelled) under the 5° C. storage condition).

TABLE 6

Stability for Coating Compositions

| Coating Composition | Room temperature storage stability: Appearance/KU | 5° C. storage stability: Appearance/KU | 50° C. storage stability: Appearance/KU |
|---|---|---|---|
| Inventive Coating Composition 1 | Good/88 | Good/83 | Good/80 |
| Inventive Coating Composition 2 | Good/89 | Good/90 | Good/85 |
| Inventive Coating Composition 3 | Good/90 | Good/100 | Good/77 |
| Inventive Coating Composition 4 | Good/88 | Good/96 | Good/75 |
| Inventive Coating Composition 5 | Good/86 | Good/89 | Good/81 |
| Comparative Coating Composition 1 | Good/93 | Bleeding/121 | Good/76 |
| Comparative Coating Composition 2 | Good/100 | Bleeding/Gelled | Good/84 |

What is claimed is:

1. A multicolor dispersion comprising a protective composition, protected first colorant particles and protected second colorant particles, wherein said protective composition protects and separates the colorant particles and said protective composition comprises,

TABLE 5

Compatibility of Aqueous Dispersions with Clay

| Aqueous Dispersions | Surfactant | EO Length | Stabilizer | Stabilizer level | Compatibility |
|---|---|---|---|---|---|
| Inventive Aqueous Dispersion 1 | FES-32 | 4 | COPS-1 | 0.66 | >30 days |
| Inventive Aqueous Dispersion 2 | A-102 | 6 | COPS-1 | 0.66 | >30 days |
| Inventive Aqueous Dispersion 3 | FES-993 | 11 | COPS-1 | 0.66 | >30 days |
| Inventive Aqueous Dispersion 4 | A-102 | 6 | AMPS | 0.66 | >30 days |
| Inventive Aqueous Dispersion 5 | A-102 | 6 | SSS | 0.66 | >30 days |
| Inventive Aqueous Dispersion 6 | A-102 | 6 | COPS-1 | 0.33 | >30 days |
| Inventive Aqueous Dispersion 7 | A-102 | 6 | COPS-1 | 1 | >30 days |
| Inventive Aqueous Dispersion 8 | A-102 | 6 | COPS-1 | 2 | >30 days |
| Comparative Aqueous Dispersion 1 | FES-32 | 4 | N/A | | <5 days |
| Comparative Aqueous Dispersion 2 | A-102 | 6 | N/A | | <10 days |
| Comparative Aqueous Dispersion 3 | FES-77 | 30 | COPS-1 | 0.66 | <15 days |
| Comparative Aqueous Dispersion 4 | DS-4 | 0 | N/A | | <3 days |
| Comparative Aqueous Dispersion 5 | RS-610 | 6 | N/A | | <1 day |
| Comparative Aqueous Dispersion 6 | PD-104 | 10 | N/A | | <1 day |
| Comparative Aqueous Dispersion 7 | A-102 | 6 | COPS-1 | 5 | <10 days |
| Comparative Aqueous Dispersion 8 | FES-32 | 4 | AM | | <5 days |
| Comparative Aqueous Dispersion 9 | 15-S-9 | 9 | COPS-1 | | <10 days |
| Comparative Aqueous Dispersion 10 | 15-S-9; PD-104; | 10 | COPS-1 | | <1 day |
| Comparative Aqueous Dispersion 11 | 15-S-40; PD-104; | 10 | COPS-1 | | <1 day |
| Comparative Aqueous Dispersion 12 | A-102 | 6 | COPS-3 | | <10 day |

(a) an aqueous dispersion of polymer particles comprising from 89% to 99.45% by weight, based on the total dry weight of the protective composition, of polymer particles, wherein said polymer particles further comprise in polymerized form from 0.33% to 2% by weight, based on the total dry weight of the polymer, of an anionic stabilizer monomer represented by the following Formula I,

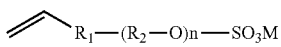

[Formula I]

wherein $R_1$ is a linkage group, $R_2$ is ethylene or propene or butylene,
n is from 0 to 50,
M is a counter salt of potassium, sodium, ammonium or lithium;
wherein said aqueous dispersion of polymer particles further comprises from 0.33% to 5% by weight, based on the total dry weight of the polymer, of a non-reactive anionic surfactant having an ethylene oxide chain length of less than 11; and
(b) from 0.5% to 10% by weight, based on the total dry weight of the protective composition, of a clay,
wherein the multicolor dispersion is prepared by mixing a dispersion of the protected first colorant particles with a dispersion of the protected second colorant particles, wherein the dispersion of the protected first colorant particles is prepared by mixing a first colorant dispersion with the protective composition, and the dispersion of the protected second colorant particles is prepared by mixing a second colorant dispersion with the protective composition wherein the dispersion of the second colorant particles has a different color from the dispersion of the first colorant particles.

2. The multicolor dispersion according to claim 1, wherein said polymer particles comprise from 0.5% to 1.8% by weight, based on the total dry weight of the polymer, of said anionic stabilizer monomer.

3. The multicolor dispersion according to claim 1, wherein said polymer particles comprise from 0.8% to 1.6% by weight, based on the total dry weight of the polymer, of said anionic stabilizer monomer.

4. The multicolor dispersion according to claim 1, wherein said anionic stabilizer monomer is selected from sodium styrene sulfonate, sodium 1-allyloxy-2-hydroxypropane sulfonate, 2-acrylamido-2-methylpropanesulfonic acid, and any combinations thereof.

5. The multicolor dispersion according to claim 1, wherein said aqueous dispersion of polymer particles comprises from 0.5% to 3% by weight, based on the total dry weight of the polymer, of a non-reactive anionic surfactant having an ethylene oxide chain length of less than 11.

6. The multicolor dispersion according to claim 1, wherein said aqueous dispersion of polymer particles comprises from 0.8% to 2% by weight, based on the total dry weight of the polymer, of a non-reactive anionic surfactant having an ethylene oxide chain length of less than 11.

7. The multicolor dispersion according to claim 1, wherein said protective composition comprises from 1% to 6% by weight, based on the total dry weight of the protective composition, of a clay.

8. The multicolor dispersion according to claim 1, wherein said protective composition further comprises from 0.05% to 1% by weight, based on the total dry weight of the protective composition, of a peptizing agent.

9. An aqueous multicolor coating composition comprising the multicolor dispersion according to claim 1.

10. The multicolor dispersion of claim 1 wherein the clay is lithium magnesium silicate.

11. A method of forming a multicolor coating comprising applying the aqueous coating composition of claim 9 to a substrate and drying.

* * * * *